(12) United States Patent
Natsume

(10) Patent No.: US 10,915,012 B2
(45) Date of Patent: Feb. 9, 2021

(54) PROJECTION TYPE DISPLAY APPARATUS

(71) Applicant: CANON KABUSHIKI KAISHA, Tokyo (JP)

(72) Inventor: Noriyuki Natsume, Ageo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/155,182

(22) Filed: Oct. 9, 2018

(65) Prior Publication Data

US 2019/0113831 A1 Apr. 18, 2019

(30) Foreign Application Priority Data

Oct. 18, 2017 (JP) .................................. 2017-201822

(51) Int. Cl.
| | |
|---|---|
| *G03B 21/14* | (2006.01) |
| *G03B 21/20* | (2006.01) |
| *G02B 27/09* | (2006.01) |
| *G02B 5/30* | (2006.01) |
| *G02B 26/02* | (2006.01) |
| *G03B 21/00* | (2006.01) |
| *G02B 27/28* | (2006.01) |

(52) U.S. Cl.
CPC ....... *G03B 21/2053* (2013.01); *G02B 5/3025* (2013.01); *G02B 26/023* (2013.01); *G02B 27/0977* (2013.01); *G02B 27/285* (2013.01); *G03B 21/00* (2013.01); *G03B 21/142* (2013.01)

(58) Field of Classification Search
CPC ........................ G03B 21/2053; G02B 27/0988
USPC ...................................................... 353/88, 97
See application file for complete search history.

(56) References Cited

U.S. PATENT DOCUMENTS

| | | | |
|---|---|---|---|
| 7,748,854 B2 * | 7/2010 | Sugino | G03B 21/2053 353/97 |
| 8,545,027 B2 | 10/2013 | Wakabayashi et al. | |
| 9,703,184 B2 | 7/2017 | Sakai et al. | |
| 2009/0244496 A1 * | 10/2009 | Sugino | H04N 9/3155 353/85 |
| 2017/0017141 A1 * | 1/2017 | Natsume | G03B 21/142 |

FOREIGN PATENT DOCUMENTS

| | | |
|---|---|---|
| JP | 2014071131 A | 4/2014 |
| JP | 5682154 B2 | 3/2015 |

\* cited by examiner

*Primary Examiner* — William C. Dowling
(74) *Attorney, Agent, or Firm* — Rossi, Kimms & McDowell LLP

(57) ABSTRACT

A projection type display apparatus includes a polarization conversion element configured to convert a polarization of a light beam emitted from a light source, and a dimmer configured to control a light quantity by rotating a first light shielding plate and a second light shielding plate configured to shield the light beam that has a polarization converted by the polarization conversion element. The first light shielding plate is disposed closer to the light source than the second light shielding plate in an optical axis direction.

9 Claims, 5 Drawing Sheets

PROJECTION TYPE DISPLAY APPARATUS

BACKGROUND OF THE INVENTION

Field of the Invention

The present invention relates to a projection type display apparatus having a dimmer.

Description of the Related Art

A projection type display apparatus may include a dimmer so as to improve the contrast and to control the brightness, on an optical path on the light source side of a liquid crystal panel. Two known dimming methods are a parallel movement method and a double-door method. The parallel movement method adjusts a light shield amount by moving two light shielding plates mutually in a plane perpendicular to the optical axis of the illumination light. The double-door method adjusts a light shield amount by rotating two light shielding plates in opposite directions around an axis perpendicular to the optical axis of the illumination light.

The double dimming type dimmer has a better space efficiency and can be configured with a smaller number of parts than the parallel movement type dimmer. The dimmer in the illumination system in the projection type display apparatus often uses a double-door type dimmer in many cases.

Japanese Patent No. ("JP") 5,682,154 discloses a double-door type dimmer that includes a bent part provided to the light shielding plate, and improves a light shielding rate of the peripheral light in the fully closed state.

The dimmer disclosed in JP 5,682,154 can improve the light shielding rate of the peripheral light in the fully closed state, but cannot shield the peripheral light as the plate moves to a position (semi-open state) in which a light shield amount reduces from the fully closed state. The lights shielding rate of the peripheral light can be improved in the semi-open state by spacing the two light shielding plates from each other in the optical axis direction so that part of the two light shielding plates overlap each other in the optical axis direction in the semi-open state.

However, when the two light shielding plates have different positions from each other in the optical axis direction, the right and left illumination beams to be shielded becomes uneven and the uneven illuminance of the projected image is likely to occur.

SUMMARY OF THE INVENTION

The present invention provides a projection type display apparatus that can shield peripheral light, efficiently improve the contrast, and suppress the uneven illuminance of a projection image.

A projection type display apparatus according to one aspect of the present invention includes a polarization conversion element configured to convert a polarization of a light beam emitted from a light source, and a dimmer configured to control a light quantity by rotating a first light shielding plate and a second light shielding plate configured to shield the light beam that has a polarization converted by the polarization conversion element. The first light shielding plate is disposed closer to the light source than the second light shielding plate in an optical axis direction.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1A:
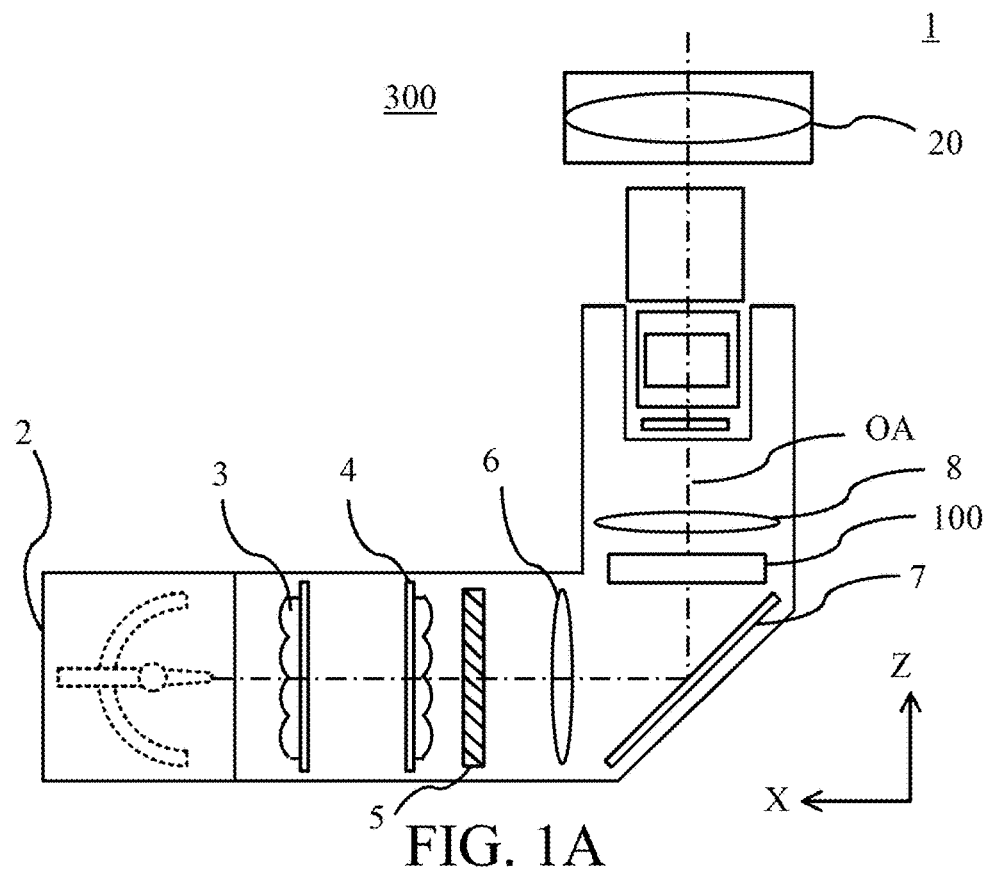
FIGS. 1A and 1B illustrate a configuration of an optical unit in a projection type display apparatus according to this embodiment.
Figure 1B:
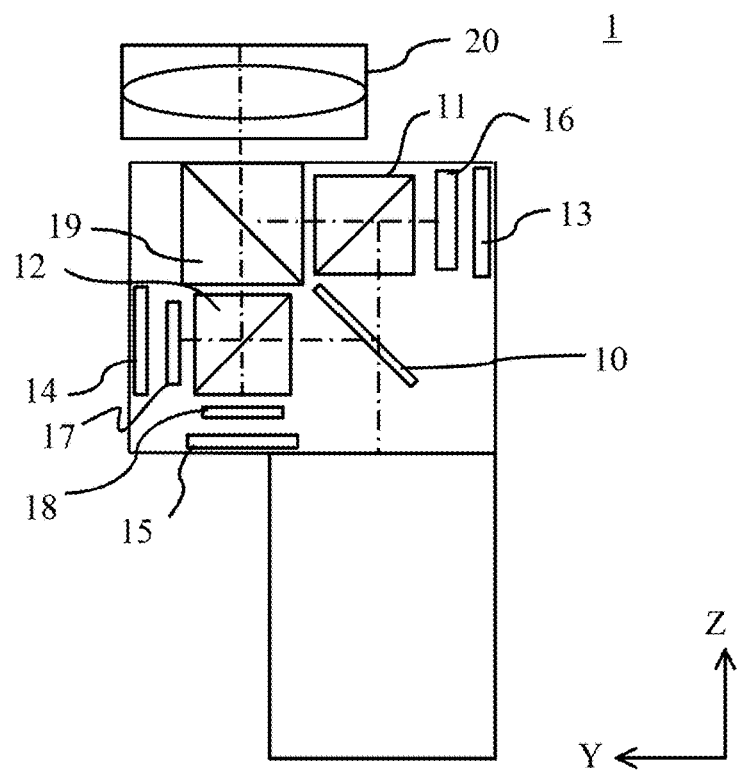

Referring now to FIGS. 1A and 1B, a description will be given of an optical unit 300 in a projection type display apparatus (projector) 1. FIGS. 1A and 1B illustrate a configuration of the optical unit (optical system) 300 in the projection type display apparatus 1. FIGS. 1A and 1B are sectional views of the projection type display device 1 (optical unit) viewed from directions orthogonal to each other. Reference numeral 2 denotes a light source, such as an ultra-high pressure mercury lamp, which emits white light in a continuous spectrum. Reference numerals 3 to 8 form an illumination optical system configured to guide light to a reflective liquid crystal panel (image display element) to be described later. Reference numeral 3 denotes a first fly-eye lens made by disposing rectangular lenses in a matrix shape, and reference numeral 4 denotes a second fly-eye lens having a lens corresponding to each lens in the first fly-eye lens. Reference numeral 5 denotes a polarization conversion element for converting unpolarized light into light having a predetermined polarization direction. Reference numeral 6 denotes a first condenser lens for condensing a light beam having a polarization converted or separated by the polarization conversion element 5. Reference numeral 7 denotes a mirror that reflects the light beam from the first condenser lens 6 and deflects it by a substantially right angle. Reference numeral 8 denotes a second condenser lens.

Reference numeral 10 denotes a dichroic mirror that reflects R (red) light and B (blue) light and transmits G (green) light. Reference numeral 11 denotes a G polarization beam splitter that transmits P-polarized light and reflects S-polarized light. Reference numeral 12 denotes an RB polarization beam splitter that performs a color separation by reflecting the R light that remains as the S-polarized light and transmits the B light as the P-polarized light. Reference numeral 13 denotes a G reflective liquid crystal panel, and reference numerals 14 and 15 denote R and B reflective liquid crystal panels, respectively. The reflective liquid crystal panels 13, 14, and 15 modulate light from the light source 2 guided by the polarization beam splitters 11 and 12 and form a desired image.

Reference numerals 16, 17, and 18 denote a red quarter waveplate, a green quarter waveplate, and a blue quarter waveplate. Reference numeral 19 denotes a combining polarization beam splitter configured to combine the R light, the G light, and the B light with one another. The combining polarization beam splitter 19 can be replaced with a dichroic mirror or a dichroic prism. Reference numeral 20 denotes a projection lens configured to enlarge and project the light combined by the combining polarization beam splitter 19 onto a projection surface, such as an unillustrated screen. That is, the projection type display apparatus 1 separates the light emitted from the light source 2, guides the separated light beams to the reflective liquid crystal panels 13, 14, and 15, and projects the light reflected by each reflective liquid crystal panel through the projection lens 20 onto the projection surface. Reference numeral 100 denotes a dimmer. The dimmer 100 shields part of light (light beam) emitted from the light source 2, and adjusts a light quantity entering each of the reflective liquid crystal panels 13, 14 and 15.

Figure 2A:
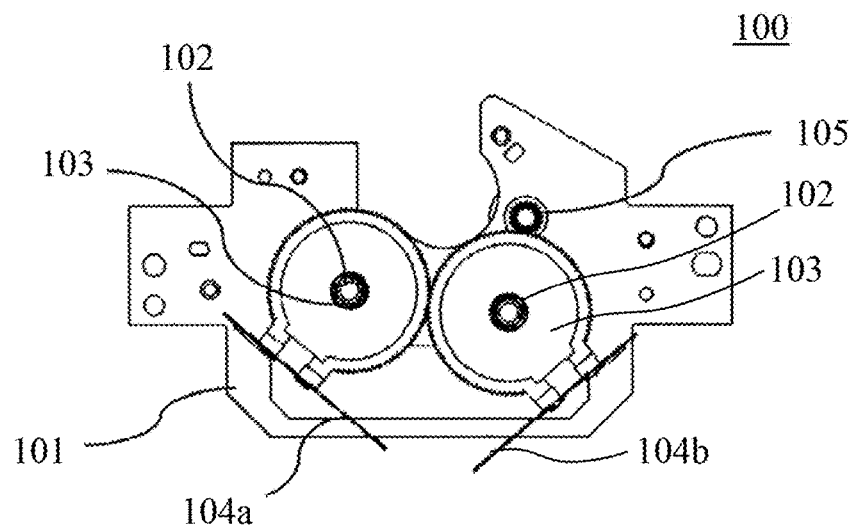
FIGS. 2A and 2B illustrate a configuration of a dimmer according to this embodiment.
Figure 2B:
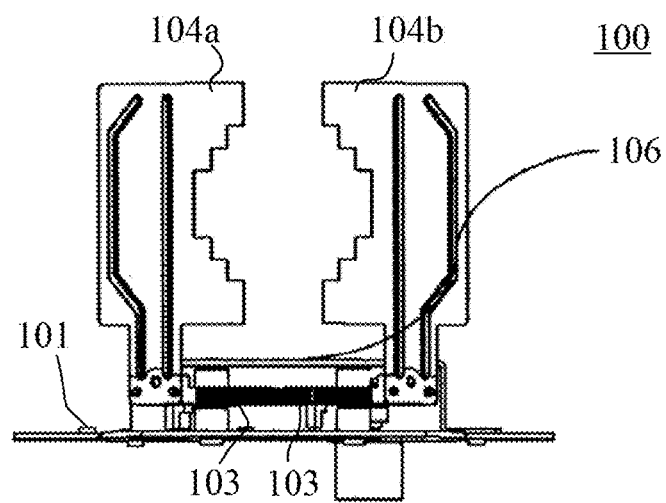

Referring now to FIGS. 2A and 2B, a description will be given of the dimmer 100 according to this embodiment. FIGS. 2A and 2B illustrate a configuration of the dimmer 100 viewed from directions orthogonal to each other. Reference numeral 101 denotes a base member made of sheet metal. A pair of metal shafts 102 are caulked in the base member 101. Reference numeral 103 denotes a pair of gears (rotating members) engaging with each other. The pair of gears 103 are rotatably supported to a pair of metal shafts 102.

Reference numeral 104a denotes a (first) light shielding plate, and reference numeral 104b denotes a (second) light shielding plate. A pair of light shielding plates 104a and 104b are fixed to a pair of gears 103. Reference numeral 105 denotes an actuator that provides a driving force to one of the pair of gears 103. The actuator 105 includes a motor and a pinion gear. A cover member 106 is attached to the base member 101. The pair of gears 103 are restricted from moving in thrust directions by the metal shafts 102 and the cover member 106. When one of the pair of gears 103 is rotated by an actuator 105, the driving force is transmitted to the other gear 103. As the pair of gears 103 rotate, the pair of light shielding plates 104a and 104b rotate around the centers of the pair of metal shafts 102 as the rotation axes. The dimmer 100 controls light by increasing or decreasing a light quantity shielded by the pair of shielding plates 104a and 104b in accordance with rotating angles of a pair of light shielding plates 104a and 104b.

Figure 3B:
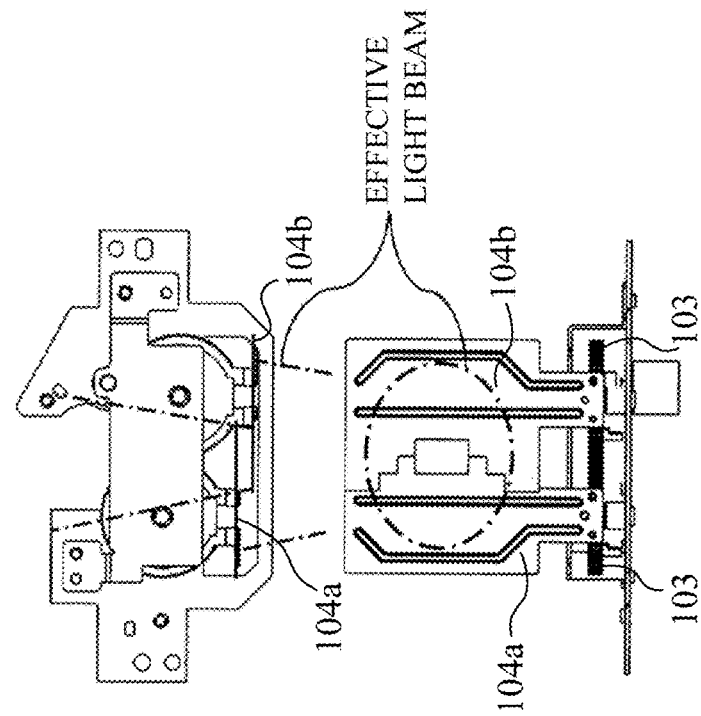
FIGS. 3A and 3B illustrate a normal state and a light shielding state of the dimmer according to this embodiment.
Figure 3A:
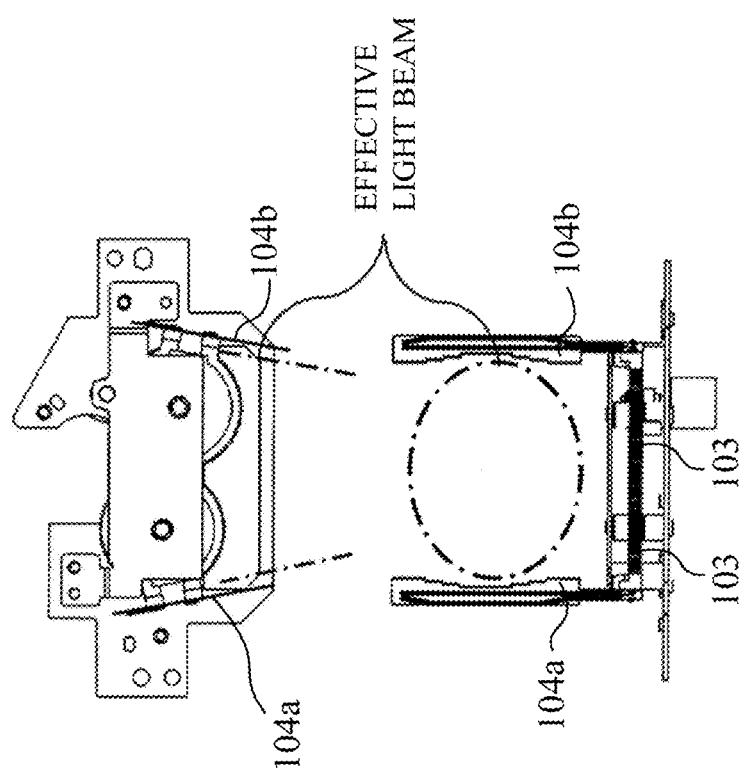
Figure 4A:
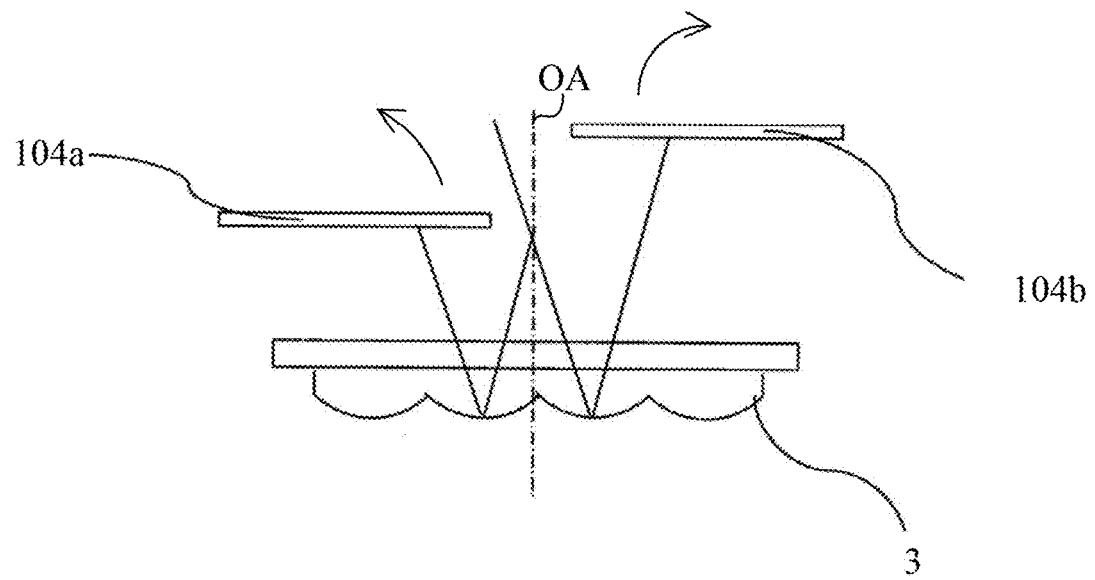
FIGS. 4A and 4B illuminate a relationship between the dimmer according to this embodiment and light.
Figure 4B:
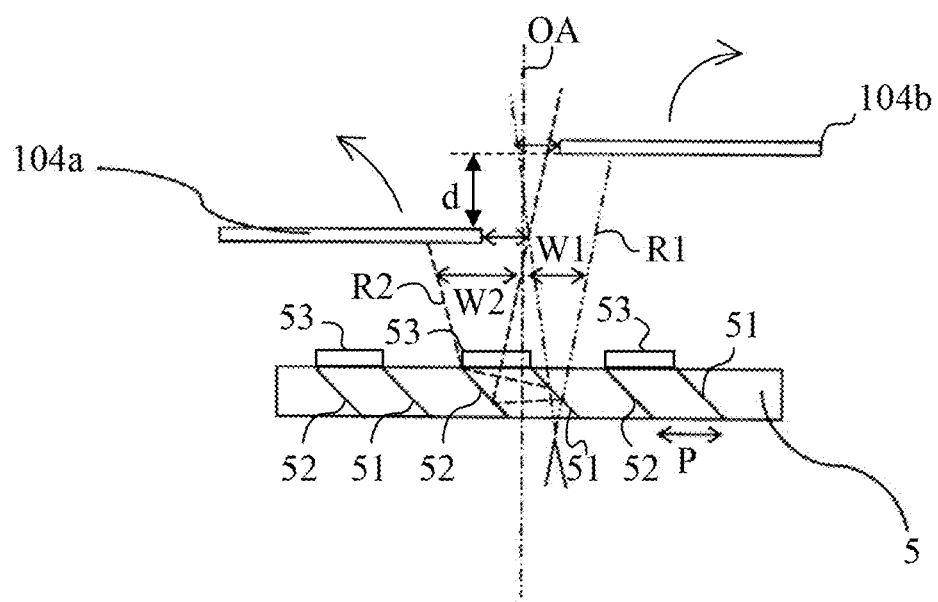

Referring now to FIGS. 3A and 3B, a description will be given of a state of the dimmer 100. FIGS. 3A and 3B illustrate states (open and closed states) of the light shielding plates 104a and 104b in the dimmer 100. FIG. 3A illustrates a minimum state (fully open state) of a light shield amount in the dimmer 100, and FIG. 3B illustrates a maximum state (fully closed state) of the light shield amount in the dimmer 100. In the fully open state illustrated in FIG. 3A, the effective light beam 30 is not shielded by the light shielding plates 104a and 104b. In the fully closed state illustrated in FIG. 3B, most of the effective light beam 30 is shielded by the light shielding plates 104a and 104b, and only part of the effective light beam 30 passes. Referring now to FIGS. 4A and 4B, a description will be given of an arrangement of the dimer 100. FIG. 4A illustrates a comparative example of the present invention, in which the dimmer 100 is disposed on the light source side of the polarization conversion element 5. FIG. 4B illustrates this embodiment in which the dimmer 100 is disposed on the projection lens 20 side of the polarization conversion element 5. FIGS. 4A and 4B illustrate fully closed states of the light shielding plates 104a and 104b. The dimmer 100 adjusts a light shield amount of the light beam by rotating the light shielding plates 104a and 104b in an arrow direction as the pair of gears 103 rotate. In practice, the light beam emitted from the light source is reflected by the mirror 7, as illustrated in FIG. 1A, but omitted for clarity purposes.

In a comparative example in FIG. 4A, the pair of light shielding plates 104a and 104b have different positions in a direction along the optical axis OA (optical axis direction). In this arrangement, left and right light shield amounts are different from each other. As a result, the uneven illuminance tends to occur on the projection image. The uneven illuminance becomes conspicuous as the light shield amounts of the dimmer 100 become larger.

On the other hand, as illustrated in FIG. 4B, the uneven illuminance is reduced by the dimmer 100 disposed behind the polarization conversion element 5. The uneven illuminance can be more effectively reduced by properly setting the positions of a pair of light shielding plates 104a and 104b in FIG. 4B in the optical axis direction based on a pitch P in the polarization conversion element 5.

As illustrated in FIG. 4B, the polarization conversion element 5 includes a polarization separation plane 51, a reflection surface 52, and a half waveplate 53. The polarization separation plane 51 is a reflection surface that reflects at least part of the light beam toward a predetermined direction. The reflection surface 52 reflects the light beam reflected by the polarization separation plane 51 toward the light shielding plates 104a and 104b. A plurality of polarization separation planes 51 and a plurality of reflection surfaces 52 are alternately provided. All of the plurality of polarization separation planes 51 and the plurality of reflection surfaces 52 are inclined to the optical axis OA in the same direction. The half waveplate 53 is disposed at a predetermined position on an exit surface of the polarization conversion element 5 so as to change the phase of the light beam reflected by the reflection surface 52. In FIG. 4B, W1 is a width on an exit surface of the polarization conversion element 5 of a light beam R1 in the effective light beam, which has transmitted through the polarization conversion element 5. W2 is a width on the exit surface of the polarization conversion element 5 of a light beam R2 in the effective light beam, which has been reflected on the polarization conversion element 5. Optical path lengths L1 and L2 of the light beam R1 and R2 satisfy a relationship expressed by the following expression (1), where P is a pitch of the polarization conversion element 5, and $\theta$ is an incident angle of light on the polarization conversion element 5.

$$L2 = L1 + P/\sin\theta \quad (1)$$

Thereby, widths W1 and W2 can be expressed as follows:

$$W1 = 2 \times L1 \times \sin\theta \quad (2)$$

$$W2 = 2 \times L1 \times \sin\theta + P \quad (3)$$

The pitch P of the polarization converting element 5 corresponds to a distance (distance in the direction perpendicular to the optical axis OA) between the adjacent polarization separation plane 51 and reflection surface 52. This embodiment may provide the polarization separation plane 51 instead of the reflection surface 52. In this case, the pitch P is a distance between the adjacent polarization separation planes 51.

As understood from the expressions (2) and (3), a spread (width) of the light beam reflected by the polarization separation plane 51 of the polarization conversion element 5 and having an exit position shifted from an incident position increases in a direction orthogonal to the optical axis direction by the pitch P of the polarization converting element 5. In the fully closed state, the (first) light shielding plate 104a disposed on the left side of (in the predetermined direction of) the (second) light shielding plate 104b in FIG. 4B is disposed closer to the polarization conversion element 5 than the light shielding plate 104b in the optical axis direction. The predetermined direction, as used herein, is a direction in which the incident light beam of the polarization conversion element 5 is reflected by the polarization separation plane 51. In other words, the light shielding plate 104b is more distant from the polarization conversion element 5 in the optical axis direction than the light shielding plate 104a. This configuration can make right and left light beams (spread of light) shielded by the light shielding plate 104 close or equal to each other.

In other words, in the fully closed state in which the uneven illuminance is most likely to occur, the positions of the light shielding plates 104a and 104b are adjusted in the optical axial direction so that the light shield amounts by the left and right light shielding plates 104a and 104b can be equal to each other as illustrated in FIG. 4B. As a result, the uneven illuminance can be effectively reduced.

In the fully closed state, the right light shielding plate 104b is separated from the left light shielding plate 104a in the optical axis direction by the pitch P of the polarization conversion element 5. However, it is necessary to increase the distance d between the light shielding plates 104a and 104b in the optical axis direction so as to increase the aperture between the light shielding plates 104a and 104b (or facilitate opening the light shielding plates 104a and 104b). Thus, this embodiment may satisfy the following expression with the distance d and the pitch P.

$$1.0 \leq d/P \leq 2.5 \quad (4)$$

Figure 5A:
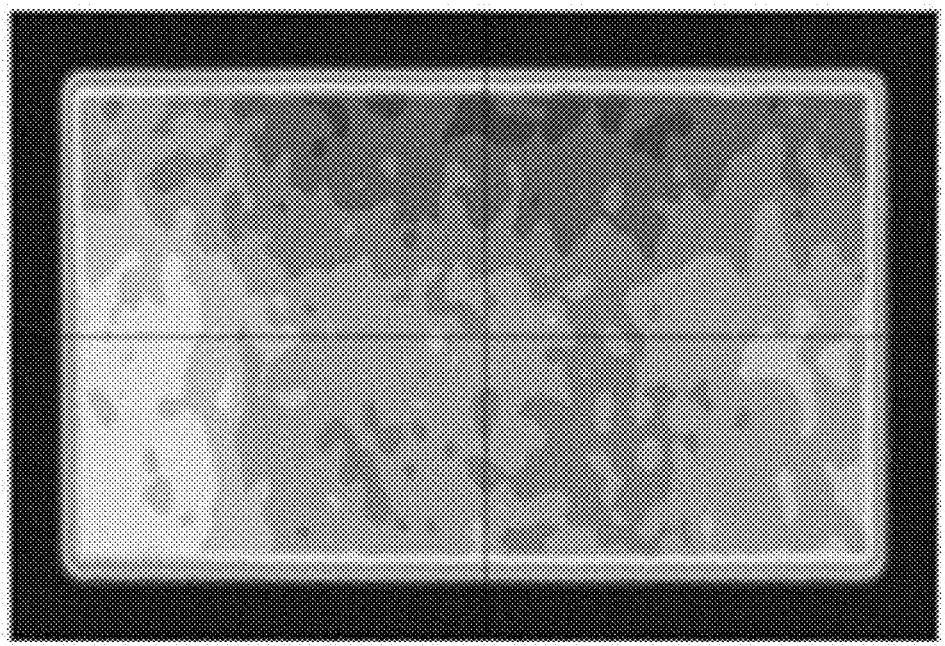
FIGS. 5A and 5B are explanatory diagrams of an uneven illuminance reduction effect according to this embodiment.
Figure 5B:
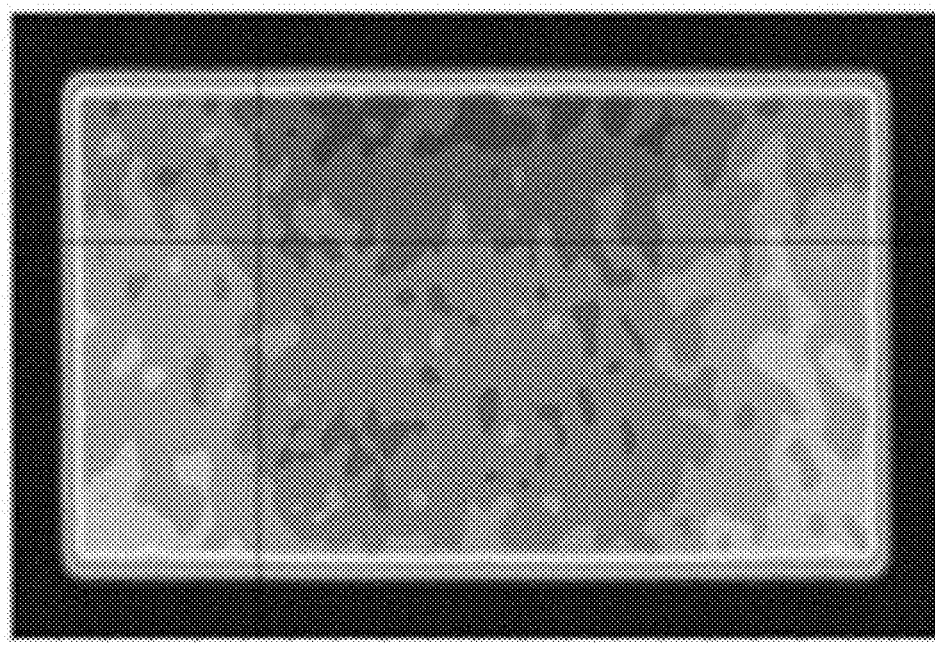

Referring now to FIGS. 5A and 5B, a description will be given of an uneven illuminance reducing effect according to this embodiment. FIGS. 5A and 5B are explanatory diagrams of the uneven illuminance reducing effect. FIGS. 5A and 5B illustrate the luminance data in a projection image corresponding to FIGS. 4A and 4B. When FIGS. 5A and 5B are compared with each other, it is understood that the illuminance data of FIG. 5B can further reduce the uneven illuminance.

In order to improve the optical performance, the dimmer 100 may be distant from the polarization conversion element 5. Due to this configuration, for example, a longer distance from the light source 2 to the dimmer 100 can reduce a reflected light quantity from the dimmer 100 returning to the light source 2. The first condenser lens 6 may be disposed on the optical path between the polarization conversion element 5 and the dimmer 100. The mirror 7 may be disposed on the optical path between the first condenser lens 6 and the dimmer 100. The dimmer 100 may be disposed on the optical path between the mirror 7 and the second condenser lens 8.

Thus, the double-door type dimmer 100 according to this embodiment makes one light shielding plate 104 located in a direction in which the light is shifted by the polarization conversion element 5 closer to the polarization conversion element 5 than the other light shielding plate 104 in the optical axis direction. This embodiment can provide a projection type display apparatus that can shield peripheral light, efficiently improve the contrast, and suppress the uneven luminance of the projection image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, while this embodiment has been described for the double-door type dimmer 100, the present invention is also applicable to a parallel movement type dimmer.

This application claims the benefit of Japanese Patent Application No. 2017-201822, filed on Oct. 18, 2017, which is hereby incorporated by reference herein in its entirety.

What is claimed is:

1. A projection type display apparatus comprising:
a polarization conversion element including a polarization separation plane which reflects first polarized light of incident light in a predetermined direction and being configured to convert the incident light into light having a predetermined polarization direction; and
a dimmer including a first light shielding plate and a second light shielding plate,
wherein the first light shielding plate and the second light shielding plate shield at least part of the light having the predetermined polarization direction converted by the polarization conversion element,
wherein the first light shielding plate is disposed in the predetermined direction with respect to the second light shielding plate, and a distance between the first light shielding plate that shields at least part of the light having the predetermined polarization direction converted by the polarization conversion element and the polarization conversion element is less than a distance between the second light shielding plate that shields at least part of the light having the predetermined polarization direction converted by the polarization conversion element and the polarization conversion element, and
wherein the polarization conversion element includes the polarization separation plane and a reflection surface configured to reflect the first polarized light reflected by the polarization separation plane towards the first light shielding plate.

2. The projection type display apparatus according to claim 1, wherein the dimmer adjusts a light shield amount of the light having the predetermined polarization direction by rotating the first light shielding plate and the second light shielding plate as a pair of rotating members rotate.

3. The projection type display apparatus according to claim 1, wherein the polarization conversion element includes a plurality of the polarization separation planes, and a distance between the first light shielding plate and the second light shielding plate in an optical axis direction of the polarization conversion element is determined based on a pitch of the plurality of polarization separation planes of the polarization conversion element.

4. The projection type display apparatus according to claim 1,
wherein the polarization conversion element includes a plurality of the polarization separation planes, and
wherein the following conditional expression is satisfied:

$$1.0 \leq d/P \leq 2.5$$

where d is a distance between the first light shielding plate and the second light shielding plate in an optical axis direction of the polarization conversion element, and P is a pitch of the plurality of polarization separation planes in a direction orthogonal to the optical axis direction.

5. The projection type display apparatus according to claim 1, further comprising a first condenser lens configured to condense the light having the predetermined polarization direction converted by the polarization conversion element,
wherein the first condenser lens is disposed on an optical path between the polarization conversion element and the dimmer.

6. The projection type display apparatus according to claim 5, further comprising a mirror configured to reflect light from the first condenser lens and disposed on an optical path between the first condenser lens and the dimmer.

7. The projection type display apparatus according to claim 6, further comprising a second condenser lens, and the dimmer is disposed on an optical path between the mirror and the second condenser lens.

8. The projection type display apparatus according to claim 1, wherein the polarization conversion element includes a plurality of the polarization separation planes inclined in the same direction.

9. The projection type display apparatus according to claim 1, wherein the polarization conversion element includes a half waveplate configured to change a phase of the first polarized light reflected by the reflection surface.

* * * * *